United States Patent [19]

Bonomo

[11] 4,062,233

[45] Dec. 13, 1977

[54] DYNAMOMETER

[76] Inventor: Melvin Bonomo, 109 S. Regency Drive, Bloomington, Ill. 61701

[21] Appl. No.: 720,647

[22] Filed: Sept. 7, 1976

[51] Int. Cl.² ............................................. G01L 3/16
[52] U.S. Cl. .................................................... 73/135
[58] Field of Search .................. 73/134, 135; 188/271, 188/290, 296

[56] References Cited

U.S. PATENT DOCUMENTS

| | | | |
|---|---|---|---|
| 2,035,576 | 3/1936 | Taylor | 188/296 |
| 2,306,845 | 12/1942 | Sherman et al. | 73/135 |
| 3,068,689 | 12/1962 | Warsaw | 73/135 |
| 3,453,874 | 7/1969 | Cline | 73/135 |

*Primary Examiner*—Charles A. Ruehl

*Attorney, Agent, or Firm*—Hosier, Niro & Daleiden, Ltd.

[57] ABSTRACT

A dynamometer is provided having a housing mounted to allow at least partial rotational displacement about its longitudinal axis, with a frictional engaging means connected thereto for engaging the external surface of a rotatable drum. This drum, which is mounted within the housing, is coupled to the prime mover so that the power of the prime mover may be determined by measuring the torque transmitted via the engaging means to the housing. Coolant is circulated through the interior of the drum while the drum is rotating within the housing, thus providing a dynamometer which is not only accurate but is easily disassembled for maintenance. The dynamometer also includes a hydraulic brake mechanism which can be regulated without a variation in the flow rate of the working fluid.

19 Claims, 8 Drawing Figures

DYNAMOMETER

BACKGROUND OF THE INVENTION

The present invention relates generally to dynamometer and power absorption devices and, particularly, to an improved dynamometer capable of more accurate power measurements and which is easily adjusted, serviced and maintained.

Several different types of dynamometers have been developed in the past. Basically, these prior art devices fall into three broad categories: mechanical brakes which depend upon frictional energy conversion, hydraulic brakes which absorb mechanical energy by shearing a working fluid, and electrical brakes which utilize variations in field forces or reversals in electric polarity as a means of energy conversion.

Examples of typical prior art mechanical and hydraulic dynamometers are illustrated in U.S. Pat. Nos. 3,068,689 and 3,757,909. While such dynamometers have been generally adequate in the past, several particular problems and disadvantages have become apparent.

Dynamometers of the type disclosed in the first of the above-mentioned patents have proven inadequate at higher RPMs. The mechanical braking mechanisms tend to "fade" or wear excessively at such higher speeds which results in inaccurate measurements. Moreover cavitation may be a problem because, as the coolant surrounding the rotating drum begins to rotate with the drum, centrifugal force causes a void along the surface of the drum. This greatly diminishes the cooling capability of the dynamometer. Maintenance presents obvious difficulties in such prior art devices since the entire dynamometer is enclosed in a water-filled housing. Finally, the cooling water in which the rotating drum is immersed causes a drag on the rotation of the central elements of the machine. Since this drag is often not capable of measurement in conventional apparatus, the accuracy of the dynamometer is adversely affected.

Hydraulic dynamometers such as that disclosed in the latter of the above-mentioned patents are often of much simpler design than mechanical apparatus. However, cavitation is also a problem which not only results in excessive wear but also adversely affects the accuracy of such apparatus. Furthermore, hydraulic dynamometers of the prior art often rely on the accurate flow control of working fluid, normally water, which is introduced at various rates into the apparatus to measure the power of the prime mover. An apparatus of this type often does not provide the accuracy of mechanical dynamometers where such flow is constant and generally not critical for the proper measurement of power.

SUMMARY OF THE INVENTION

Accordingly, the present invention is directed to an improved dynamometer which substantially overcomes the disadvantages and problems associated with prior art devices. This improved dynamometer utilizes both mechanical and hydraulic braking systems, either alone or in combination, which allows its use over substantially broader RPM and horsepower ranges.

Generally, the improved dynamometer of the present invention includes a housing and a drum which is rotatably mounted within the housing. A prime mover is coupled to the drum, and torque developed by the prime mover is transmitted from the drum to the housing via a mechanical braking mechanism acting on the exterior of the drum and/or a hydraulic braking mechanism mounted within the drum. Heat generated by the mechanical braking system is dissipated by circulating a coolant through the interior of the drum, which coolant is also employed as the working fluid in the hydraulic braking mechanism. Optionally, cooling media may also be applied to the exterior of the drum to provide maximum heat dissipation.

While the mechanical braking mechanism is controlled by conventional means, the hydraulic braking mechanism is regulated by a novel arrangement wherein the amount of shear force developed is controlled by a mechanical linkage mounted conveniently on the outside of the housing. This arrangement allows the use of a constant flow rate working fluid and provides more accurate power measurement.

BRIEF DESCRIPTION OF THE DRAWINGS

The novel features which are believed to be characteristic of the invention are set forth in the appended claims. The invention itself, however, together with further objects and attendant advantages thereof, will be best understood by reference to the following description taken in conjunction with the accompanying drawings, in which:

DETAILED DESCRIPTION OF THE INVENTION

Figure 1:
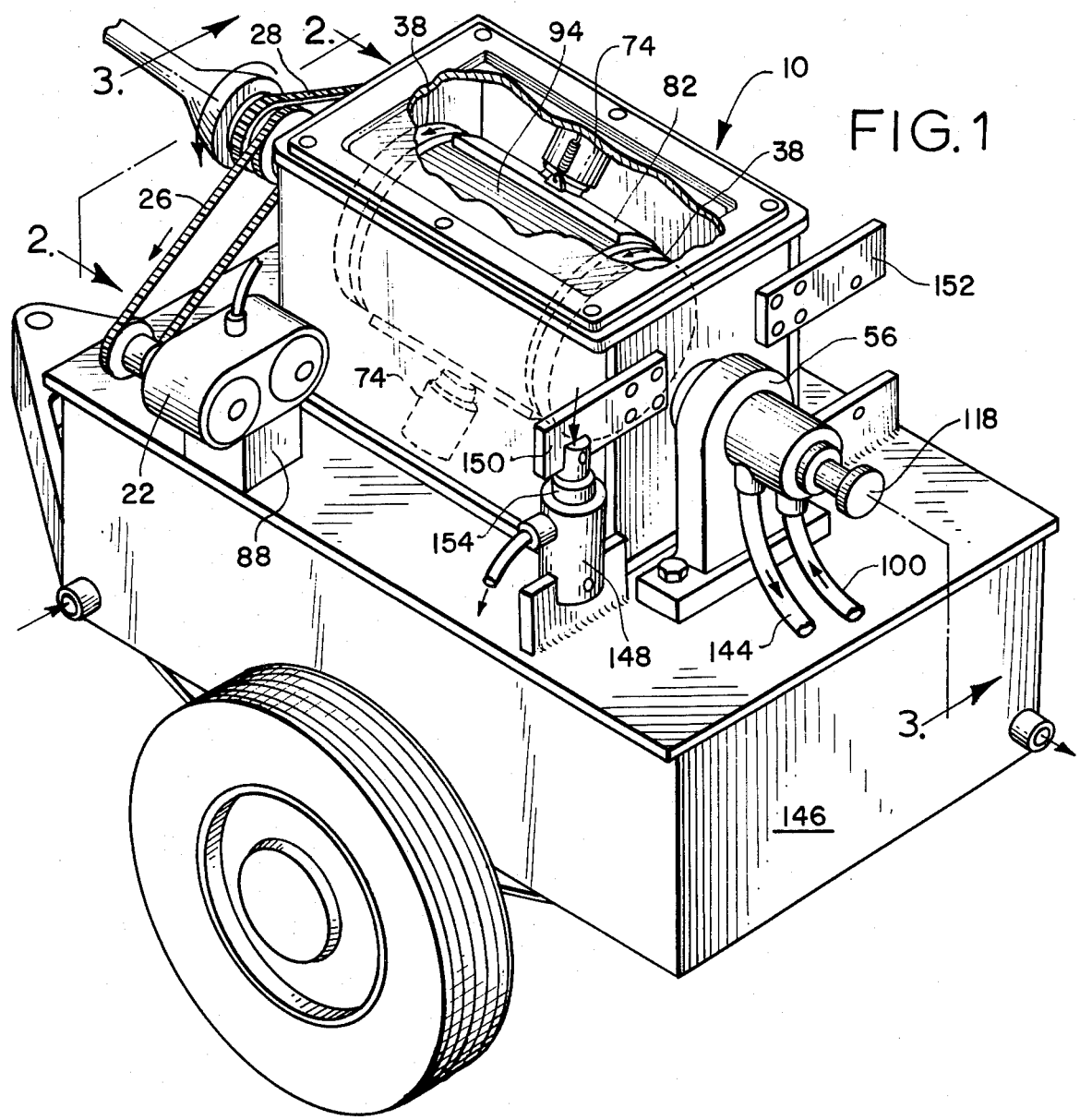
FIG. 1 is a partially cut-away perspective view of one embodiment of the invention.
Figure 2:
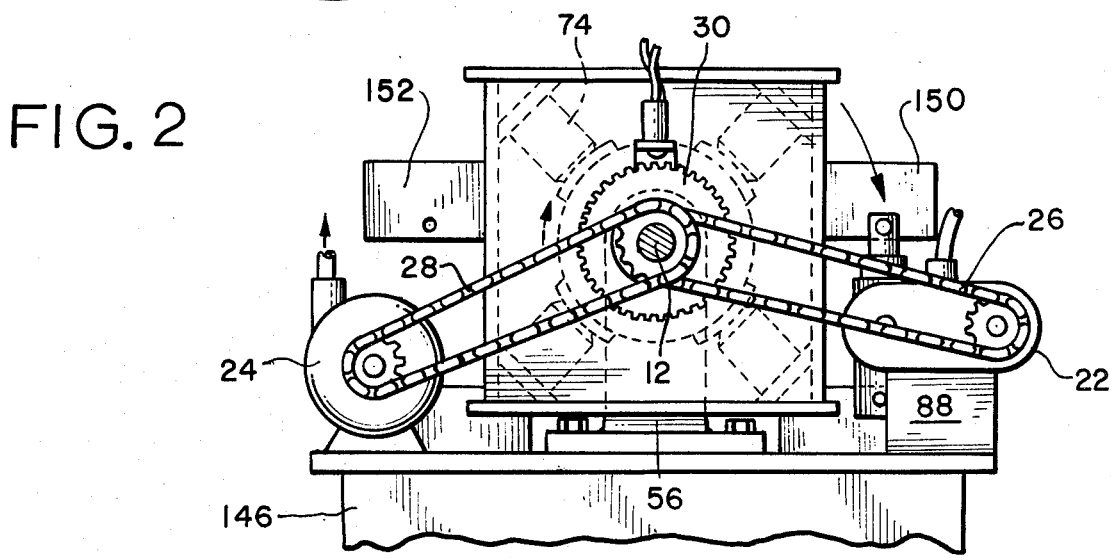
FIG. 2 is an end elevation view of the upper portion of the embodiment illustrated in FIG. 1.
Figure 3:
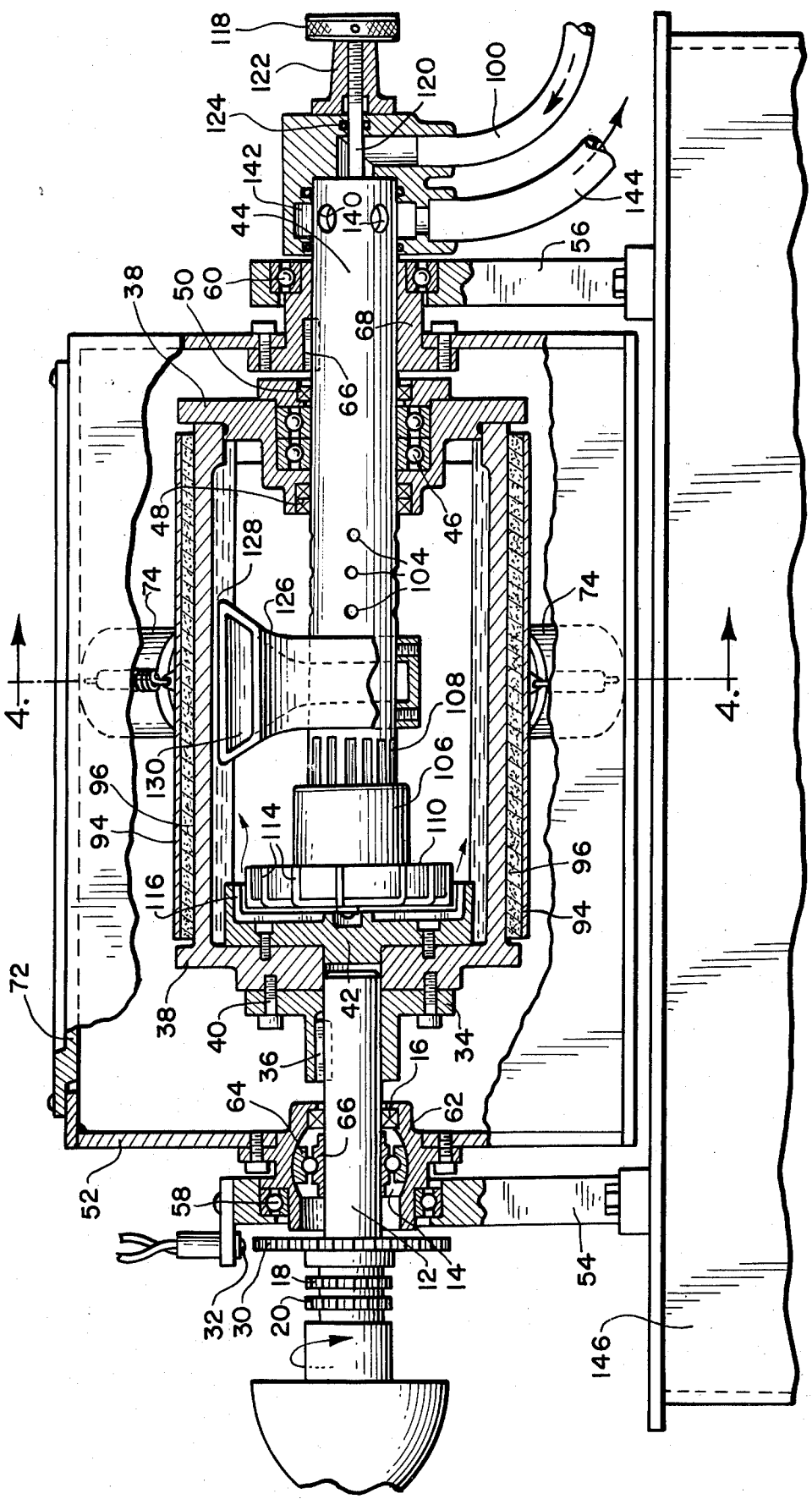
FIG. 3 is a longitudinal view taken along line 3—3 of FIG. 1 illustrating in greater detail the mounting assembly for the housing and drum.

The dynamometer of the present invention combines the advantages of prior art dynamometers yet has eliminated the accompanying disadvantages. According to this invention there is provided a dynamometer comprising a novel arrangement of structural components. A housing is provided which is mounted to allow at least a partial displacement about its longitudinal axis. A drum is rotatably mounted within the housing with means for coupling the drum to a prime mover positioned exterior to the housing, i.e., an input shaft. Engaging means are connected with the housing for frictionally engaging the external surface of the rotatable drum. Means are also provided for measuring the torque transmitted to the housing by the engaging means upon the rotation of the drum and for measuring the R.P.M. of the input shaft. The heat which is generated by the frictional engagement of the rotating drum is removed by means which circulate a coolant through the interior of the drum.

The engaging means of the present invention will typically be a mechanical brake which is secured to the interior of the housing. Normally, a plurality of brakes are provided, which are evenly spaced around the drum so that frictional resistance to its rotation is evenly distributed. The frictional engagement of the rotating drum causes a resultant rotational force to be transmitted to the housing. This force, or torque, is measured by a transducer or other mechanism which converts the torque to a signal discernible by the operator.

The engaging force which is exerted by the brake against the rotating drum, is provided hydraulically by a pump which provides oil under pressure to the brake pistons in each of the brake assemblies. This pressure may, of course, be controlled by the operator of the dynamometer.

The means for circulating coolant includes a pump which provides coolant to the apparatus via a central shaft extending through the center of the rotatable drum. This shaft has channels which distribute coolant through the interior of the drum. A coolant takeout assembly or scoop is mounted to the central shaft to remove coolant which, due to the rotation of the drum, collects adjacent the inner periphery of the drum. This heated coolant passes through the central shaft and out of the housing to the coolant reservoir. The central shaft is rigidly coupled to the housing so that the forces transmitted to the scoop by the moving coolant within the drum is added to that torque transmitted by the brakes to the housing. In this manner more complete accuracy of the dynamometer is attained.

In addition to the frictional braking mechanism, the present invention also employs a hydraulic braking mechanism. Coolant is discharged into the drum via the end of the central shaft and is sheared between a stator and rotor, thereby transmitting torque from the rotating drum to the housing.

In the embodiment of the invention chosen for purposes of illustration in the drawings, the dynamometer is indicated generally at 10. The prime mover (not shown) is coupled to one end of drive shaft 12 for rotation therewith. The drive shaft 12 is rotatably mounted in ball bearing assembly 14 and is provided with a seal 16 to prevent contamination.

Sprocket wheels may be provided on the drive shaft 12 if the hydraulic brake fluid and coolant pumps are to be powered off of the prime mover. In the depicted apparatus drive sprocket wheels 18 and 20 drive the hydraulic brake fluid and coolant pumps 22 and 24, respectively, via drive chains 26 and 28. These pumps should be reversible since it is desirable that the dynamometer be operable in either rotational direction. Preferably, however, independently powered pumps are used, in which case they need not be reversible. Of course, independently powered pumps help to achieve more accurate power measurements.

Gear wheel 30 with follower 32 is also shown in the drawings. The follower is connected to a tachometer (not shown) to provide the operator with the speed of revolution of the prime mover.

The drive shaft 12 is secured on the interior of the apparatus to flange 34 by key 36. The flange in turn is secured to the rotatable watertight drum 38 by bolts 40. This arrangement allows for relatively simple disassembly of the dynamometer to ease maintenance. A faceplate or rotor 42, to be discussed in detail below, is removably secured to the inner surface of the drum at the end adjacent the drive shaft 12. The drum 38 is mounted for rotation on central shaft 44 by bearing assembly 46 and is also provided with seals 48 and 50.

Housing 52 is mounted on stationary supports 54 and 56 to allow at least a partial rotational displacement about its longitudinal axis. In the illustrated embodiment bearing assemblies 58 and 60 provide this capability. Ball bearing housing 62 carrying bearing assembly 14 is removably mounted in the housing 52. The outer race 64 of bearing assembly 14 is carried by the bearing housing 62 and the inner race 66 embraces drive shaft 12. Thus, the housing is rotatable both with respect to the stationary supports 54 and 56, and the drive shaft 12. On its opposite longitudinal end the housing is secured via key 68 and flange 70 to the central shaft 44 so that these two components are stationary relative to one another. Again, the flange 70, to which the housing 52 is removably attached, is provided to ease disassembly. Inspection cover 72 is located at the top of the housing to allow expeditious inspection or disassembly of the interior components of the dynamometer. Vents (not shown) may be provided in the housing 52 to aid in cooling the apparatus.

Figure 4:
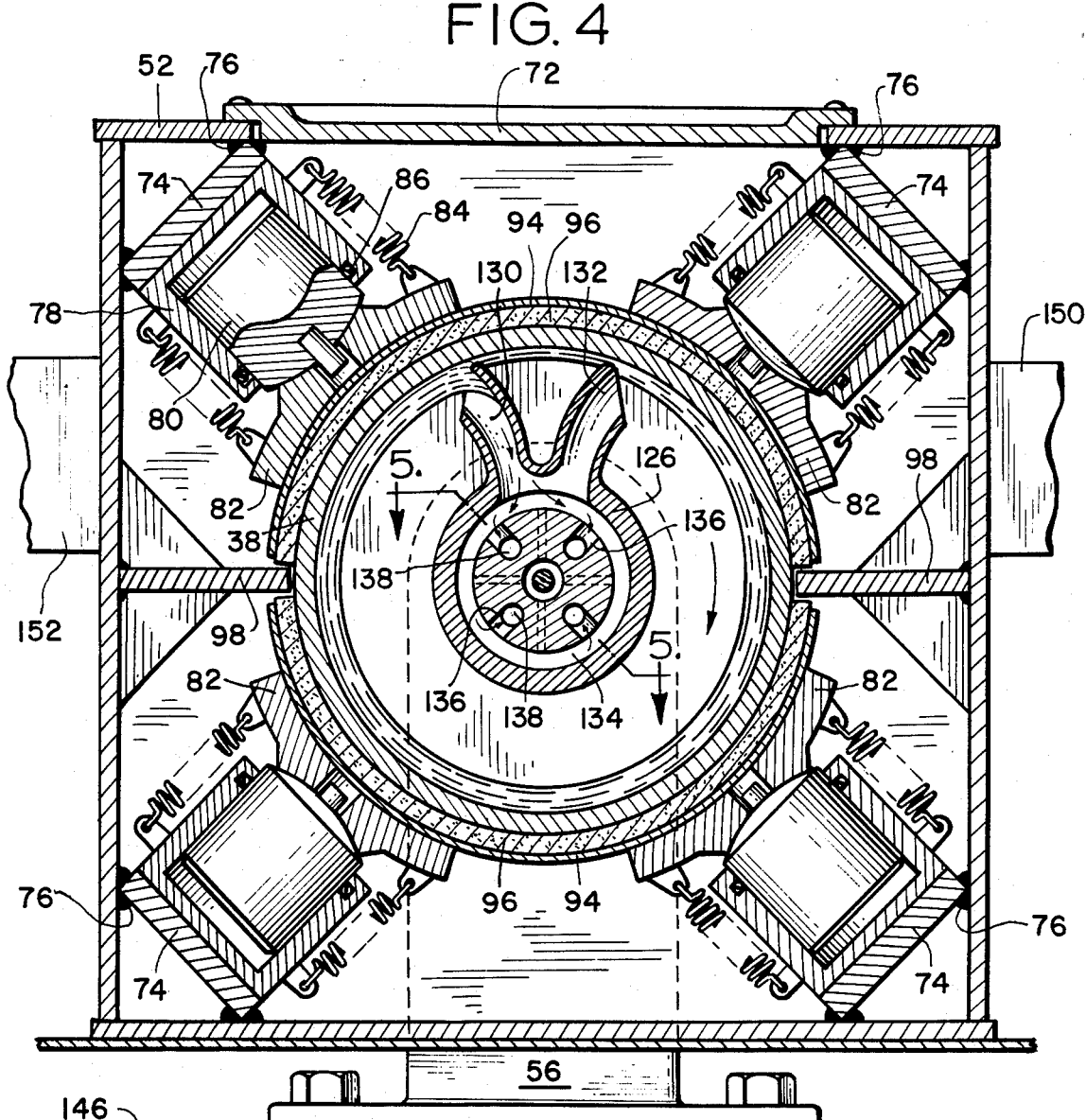
FIG. 4 is a transverse sectional view taken along line 4—4 of FIG. 3.

As is clearly shown in FIG. 4, the depicted apparatus includes four brakes 74 which are angularly spaced 90° from each other around the exterior of the drum 38 and are connected to the housing 52, here by welds 76. Each of the brakes includes cylinder 78, piston 80 and brake shoe 82, with springs 84 utilized for outwardly biasing the brake shoe and piston. The position of the piston 80 in cylinder 78 is controlled in response to variations in hydraulic oil pressure in the cylinder. Oil seal rings 86 are also provided in each cylinder.

Figure 8:
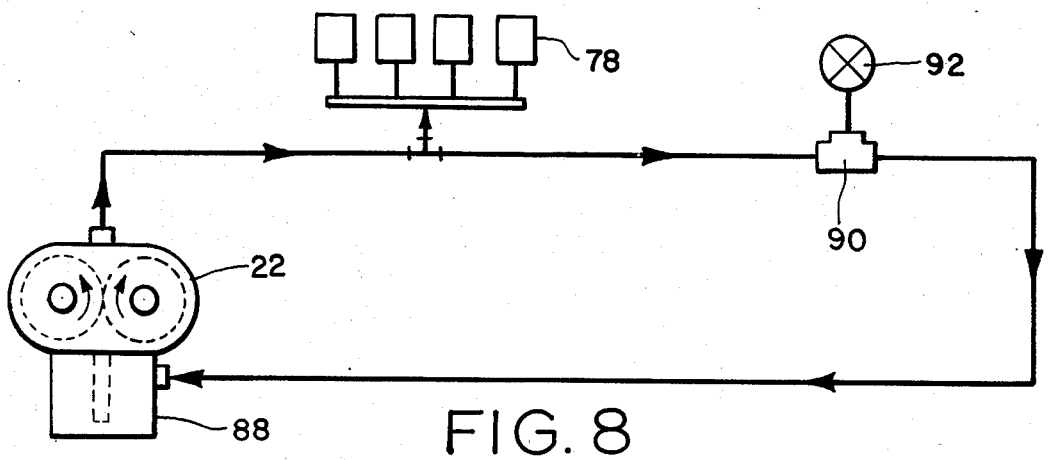
FIG. 8 is a schematic diagram of the hydraulic fluid system of the present invention.

FIG. 8 shows a schematic flow chart of the hydraulic fluid system. Pump 22 takes hydraulic fluid, such as oil, from sump 88 and delivers it under pressure to the brake cylinders 78 via conventional tubing. A pressure regulating valve 90 is positioned on the low side of the system with a control valve 92 at the operating station to regulate the return of oil to the sump 88 and thus control the oil pressure in the brake cylinders 78.

The brake shoes 82 exert pressure on the back-up plates 94 and brake linings 96 adjacent thereto. The back-up plates and brake linings distribute pressure evenly around the periphery of the drum 38. The brake linings 96 may be formed of conventional resin bonded asbestos or other materials well known to those skilled in the art. The shoes and linings are separated by a plurality, in this case two, lining stops 98 which are secured to the housing and extend almost to the outer surface of the drum. The purpose of these stops 98 is to prevent the brake linings 96 and back-up plates 94 from rotating with the drum.

Coolant, normally water, is evenly distributed along the interior of the drum through central shaft 44 which, in the preferred embodiment, is in axial alignment with power shaft 12. Coolant supply hose 100 leads from water pump 24 to the coolant axial bore 102, a longitudinal chamber in the radial center of the central shaft 44. Coolant charging ports 104 are provided at an intermediate portion of the central shaft 44. The ports 104 comprise a series of radial channels displaced 90° with respect to each other extending from the axial bore to the outer periphery of the central shaft 44.

A stator 106 is provided at the end of central shaft 44, the stator slidably engaging the central shaft 44 via splines 108. Thus, the stator may be displaced longitudinally along the end portion of the central shaft 44 but will not rotate with respect to the shaft. The closely fitting splines 108 prevent coolant leakage therethrough.

Figure 5:
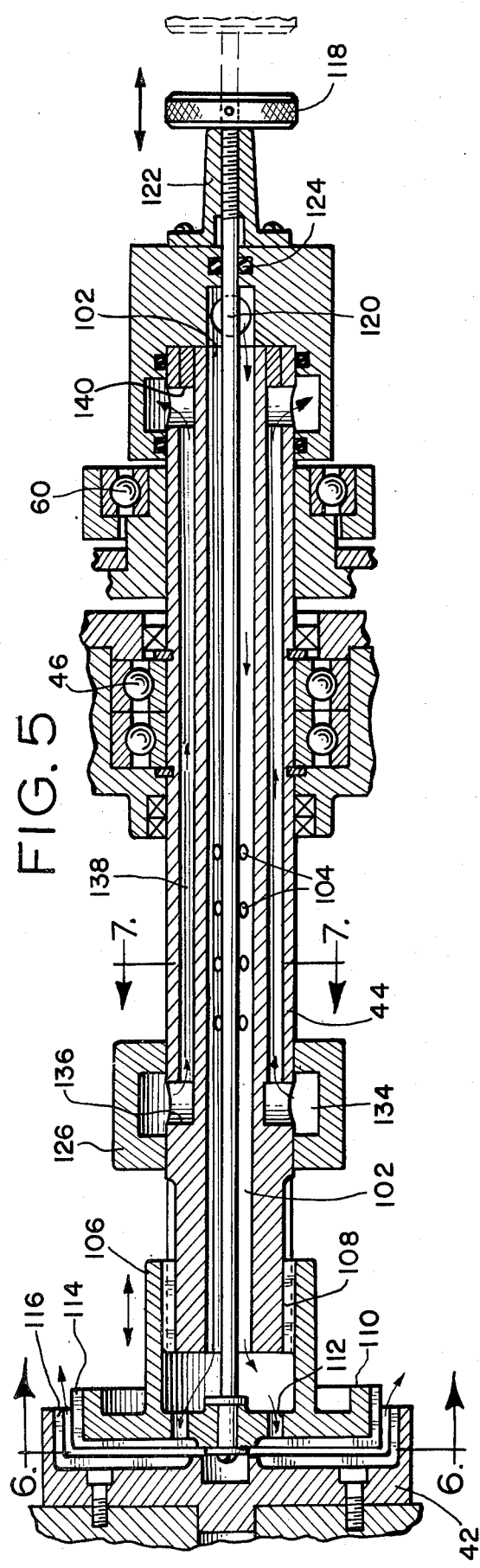
FIG. 5 is a longitudinal sectional view taken along line 5—5 of FIG. 4 showing in greater detail the means for circulating coolant within the drum.

The stator 106 has an endplate 110 with a plurality of ports 112 axially spaced around its center to allow coolant to pass therethrough. Raised radial ribs 114 extend from the center portion of the endplate 110 and are evenly spaced on each side of the endplate ports 112. The rotor 42 of the drum 38, which is preferably in axial alignment with the endplate of the stator 106, also has raised radial ribs 116. In order to avoid violent shearing action it is preferred that the number of ribs 114 be different than the number of ribs 116. As is illustrated in FIG. 5, the rotor 42 may have a cup-shaped configuration which is sized to receive the endplate 110 of the stator 106 in telescopic relation.

These components form a hydraulic braking mechanism in which the coolant is allowed to pass out of the stator ports 112 to the space between stator 106 and rotor 42. Since the rotor is rotating relative to the stator, the water passing there between is sheared transmitting torque from the rotor to the stator. This torque is then transmitted to the housing 52 via the central shaft 44. At low rotational speeds the shear force is minimal but at higher speeds it becomes a substantial factor.

The shear forces may be varied, in the preferred embodiment, by changing the axial position of the stator 106 relative to the rotor 42. In the depicted apparatus, adjustment knob 118 is provided at the end of rod 120, the rod being threaded into sleeve 122. A seal 124 is provided to prevent coolant leakage through sleeve 122. The opposite end of the rod 120 is secured to the endplate 110 of stator 106. By rotating the knob 118 the longitudinal position of the stator is varied with respect to the drum rotor 42. This will increase or decrease the extend to which the coolant is sheared and thereby control the amount of torque transmitted to the central shaft 44. Of course, at higher RPMs the hydraulic braking mechanism provides more accurate measurement of prime mover power than the mechanical braking mechanism, since fading is characteristic of mechanical brakes at higher speeds.

To remove coolant from the drum, scoop 126 is secured to the central shaft 44 at a point within the drum 38. A gap 128 is provided between the drum and the scoop 126 so that the water immediately adjacent the drum will remain to maintain the cooling capability at this point. Since the scoop is rigidly secured to central shaft 44, the torque and/or linear momentum which is transmitted to the scoop 126 from the rapidly rotating water is measurable through the transducer described below. Two takeout ports 130 and 132 are provided on the scoop 126 so that the apparatus is operable regardless of the direction of rotation of the drum and prime mover coupled thereto.

Figure 7:
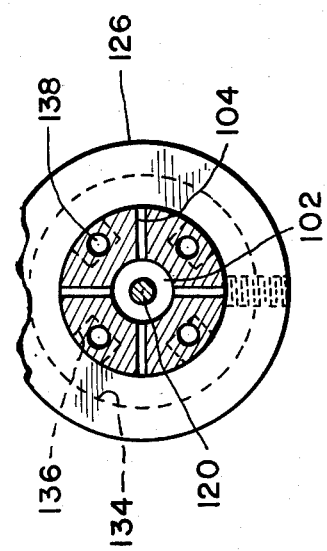
FIG. 7 is a transverse sectional view taken along line 7—7 of FIG. 5.
Figure 6:
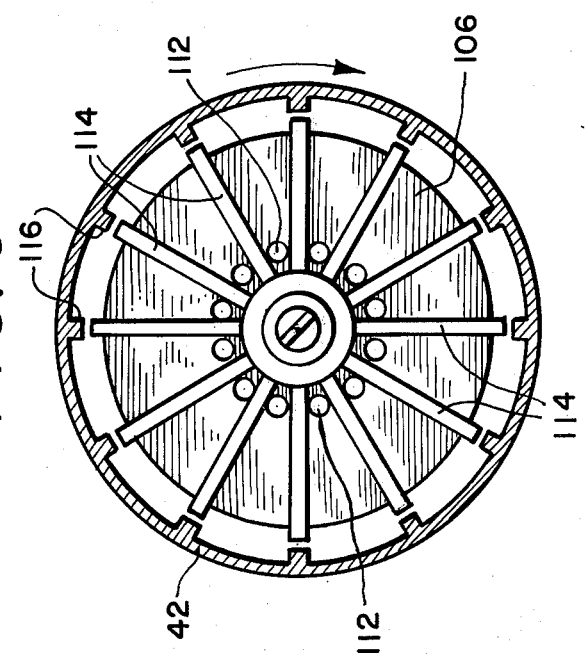
FIG. 6 is a transverse sectional view taken along line 6—6 of FIG. 5.

An annular recess 134 in scoop 126 allows coolant to be evenly distributed around the periphery of the central shaft for removal from the apparatus. The central shaft 44 is provided with ports 136 at this point which connect to one or more longitudinal coolant discharge channels 138, displaced by 90° relative to one another and by 45° relative to the radial feed ports 104 in the central shaft 44 as seen in FIG. 7. Radial discharge ports 140 allow the coolant to flow out of the discharge channels 138 and into discharge header 142, to which the coolant discharge hose 144 is attached. The coolant is led to reservoir 146 where a conventional heat exchanger (not shown) may be provided to cool the water. Of course, other structural arrangements for circulation of the coolant through the drum will be apparent to those skilled in the art.

The torque which is transmitted via central shaft 44 to housing 52 is presented to transducer 148 by an arm 150, secured to the housing. The illustrated apparatus includes a second arm 152 which would be used if the power takeoff shaft of the prime mover were to rotate in a clockwise direction in FIG. 1. The transducer 148 is of conventional design which converts the torque transmitted to the housing to a discernible signal in a manner well known in the art. In the preferred embodiment, an electrical signal is generated and relayed to the operating station (not shown).

In operation, after the prime mover has been coupled to drive shaft 12, the prime mover is started so that drive shaft 12 and drum 38 connected thereto begin to rotate. The hydraulic oil pump 22 and coolant pump 24 are at this time providing power and cooling fluid to the dynamometer if they are driven off the drive shaft 12 and, if they are not, the pumps are individually started. Since the regulating valve is at a low setting, biasing springs 84 maintain the brakes 74 in such a position that a minimal amount of pressure is being exerted on the drum at this time. Of course, since coolant is fed at a constant rate, circulation is provided through the interior of the drum 38 regardless of the position of the brakes.

When the prime mover reaches the desired speed, the operator may increase the setting on the pressure regulating valve 90 which causes an increase in the brake pressure being exerted on the outside of the drum 38. Thus, torque is transmitted from the rotating drum 38 to the housing 52, to which the brakes 74 are connected.

At the same time, cooling water is being circulated from the coolant pump 24 through the central shaft 44 to the interior periphery of the drum 38. A portion of the coolant passes through radial ports 104 in the central shaft while the remainder passes out the end of the stator 106 between the stator endplate 110 and the drum faceplate 42. After the coolant has passed into the interior of the drum, centrifugal force causes it to collect against the inner wall of the drum 38. Heat from the frictional engagement of the exterior of the wall is thus dissipated to the coolant. Since cold water is more dense than warm water, the colder coolant gravitates as far outward as possible, thus forcing the warmer water radially inward. This warmer water is removed by one of the scoop ports 130 or 132 depending upon the direction of rotation of the prime mover. If the power is to be tested at higher RPMs the operator may lower the hydraulic pressure to the brakes 74 and turn knob 118 to move the stator 106 and its endplate 110 closer to the rotor 42 thereby increasing the shearing of coolant between the stator and rotor. The torque which is transmitted via the water and the scoop 126 and the hydraulic brake is, of course, conveyed to the housing 52. The total torque transmitted is then converted to an electrical signal by the torque measuring means 148. This signal, indicative of torque, along with that generated by the gear 30 and follower 32, indicative of input RPM, are transmitted to the operating station which calculates shaft horsepower in any conventional manner.

Of course, it should be understood that various changes and modifications in the preferred embodiments described herein will be apparent to those skilled in the art. Such changes and modifications can be made without departing from the spirit and scope of the present invention and without diminishing its attendant advantages. It is therefore, intended that such changes and modifications be covered by the following claims.

I claim:

1. A dynamometer, comprising:
a housing mounted to allow at least a partial rotational displacement about its longitudinal axis;
a drum rotatably mounted within said housing;
means for coupling said drum to a prime mover positioned exterior to said housing;
means connected with said housing for frictionally engaging the external surface of said drum;
means for measuring torque transmitted to said housing by said engaging means upon the rotation of said drum; and ;p1 means for circulating a coolant through the interior of said drum while said drum is rotating within said housing, said means for circulating a coolant including a central coolant supply and discharge shaft rigidly secured to said housing and extending axially into said drum, and coolant takeout means extending radially from said central shaft to the inner periphery of said drum, said circulating means thereby also comprising means to transmit torque generated by the prime mover to said housing.

2. The dynamometer of claim 1 wherein said means for frictionally engaging the external surface of said drum comprises at least one friction brake with means for varying the engagement pressure thereof.

3. The dynamometer of claim 2 wherein said means for varying the engagement comprises at least one hydraulic cylinder.

4. The dynamometer of claim 1 wherein said means for measuring torque comprises an arm secured to said housing, said arm being coupled to means for measuring torque.

5. The dynamometer of claim 1 further comprising a coolant reservoir and wherein said circulating means includes a pump arranged to convey said coolant from said reservoir into the interior of said drum.

6. A dynamometer, comprising:
a housing;
a drum rotatably mounted within said housing;
a drive shaft coupling one end of said drum to a prime mover positioned exterior to said housing;
means connected with said housing for frictionally engaging the external surface of said drum;
means for measuring torque transmitted to said housing by said engaging means upon the rotation of said drum; and
means for circulating a coolant through the interior of said drum, said circulating means including a central shaft extending through the other end of said drum into the interior thereof, said coolant being supplied to and discharged from the interior of said drum through said central shaft.

7. The dynamometer of claim 6 wherein said central shaft includes an axial bore with charging ports leading from said axial bore to the outer surface of said central shaft at points within said drum so that coolant can flow through said central shaft and into said drum, at least one coolant takeout means secured to said central shaft within said drum, and a coolant discharge channel within said central shaft leading from said takeout means to the exterior of said drum so that coolant within the rotating drum flows into said takeout means and is discharged from the drum through said discharge channel.

8. The dynamometer of claim 7 wherein said coolant takeout means comprises at least one takeout port positioned adjacent a portion of the inner periphery of said drum.

9. The dynamometer of claim 8 wherein said charging ports comprise both radial ports positioned at an intermediate portion of said central shaft and axial ports positioned at an end of said central shaft so that a portion of the coolant will pass into said drum through said radial ports and the remainder will flow into said drum through said axial ports.

10. The dynamometer of claim 9 further comprising a stator rigidly mounted on the end of said central shaft within said drum axially adjacent said one end of said drum so that the coolant discharged from said axial ports may be sheared to transmit torque from said drum to said housing.

11. The dynamometer of claim 10 wherein said stator slidably engages said central shaft to allow axial displacement thereon so that the extent to which the coolant is sheared may be regulated.

12. The dynamometer of claim 11 further comprising means disposed exterior to said housing for adjusting the axial displacement of said stator.

13. A dynamometer, comprising:
a housing mounted to allow at least a partial rotational displacement about its longitudinal axis;
a drum rotatably mounted within said housing;
a drive shaft extending through said housing coupling a prime mover to said drum;
means connected to said housing for frictionally engaging the external surface of said drum whereby said engaging means transmits torque to said housing;
means for circulating a coolant through the interior of said drum while said drum is rotating within said housing;
means for shearing at least a portion of said coolant as it circulates through said drum to transmit torque from said drum to said housing; and
means for measuring torque transmitted to said housing by said engaging means or said shearing means.

14. The dynamometer of claim 13 wherein said circulating means includes a central shaft to which coolant is supplied under pressure, said central shaft being rigidly coupled to said housing and mounted coaxially with said drive shaft, said central shaft also having an axial bore with radial ports along an intermediate portion thereof within said drum and axial ports at the end thereof within said drum so that some of the coolant will pass into said drum through said radial ports and said portion of said coolant will flow into said drum through said axial ports.

15. The dynamometer of claim 14 wherein said shearing means includes a stator slidably mounted on said central shaft within said drum to allow axial but not radial displacement thereof with respect to said central shaft, and means for varying the axial position of said stator, whereby the clearance between said drum and said stator may be adjusted to regulate the torque transmitted to said housing from said drum by said shearing means.

16. A dynamometer comprising:
a shaft mounted to accommodate at least partial rotational displacement about its longitudinal axis;
a drum rotatably mounted on said shaft;
means for coupling said drum to a prime mover;
means for circulating a coolant through said drum;
means for shearing at least a portion of said coolant to transmit torque generated by said prime mover to said shaft, said shearing means including a rotor which rotates with said drum, a stator slidably mounted on said shaft to allow axial displacement thereof relative to said rotor but not radial displacement thereof relative to said shaft, and coolant charging ports which open into the interior of said drum between said rotor and said stator;

means for measuring torque transmitted to said shaft by said shearing means; and means disposed outside said drum for regulating the extent to which said portion of said coolant is sheared.

17. The dynamometer of claim 16 further comprising a coolant reservoir and wherein said circulating means includes a pump arranged to convey said coolant from said reservoir to said charging ports.

18. A dynamometer comprising:

a first shaft mounted to accommodate at least partial rotational displacement about its longitudinal axis;

a drum mounted on said first shaft;

means comprising a drive shaft for coupling a prime mover to a rotor mounted within said drum;

a stator rigidly connected to said first shaft adjacent said rotor within said drum;

means for circulating a coolant through said drum and including coolant charging parts which open into the interior of said drum between said rotor and stator, whereby upon rotation of said drive shaft said coolant is sheared by said rotor and stator;

means disposed outside said drum for axially displacing either said rotor or said stator, whereby the extent to which said coolant is sheared may be regulated; and means for measuring the torque transmitted to said first shaft by virtue of the shearing of said coolant.

19. The dynamometer of claim 18 wherein said rotor and stator cooperate in telescopic relation to shear said coolant.

* * * * *